No. 659,749. Patented Oct. 16, 1900.
H. JASSOY.
RAILROAD SLEEPER.
(Application filed July 28, 1900.)
(No Model.)
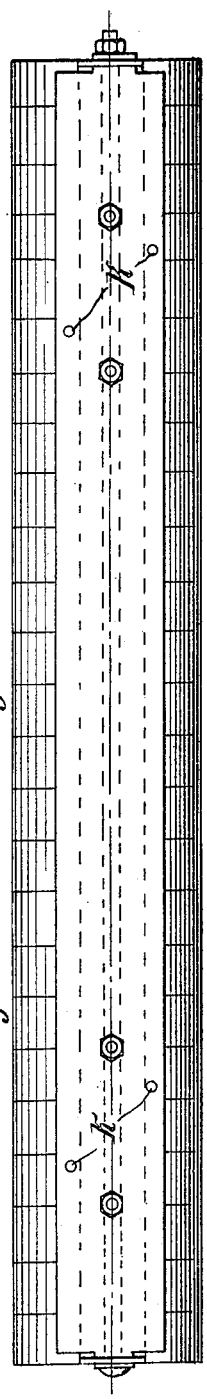
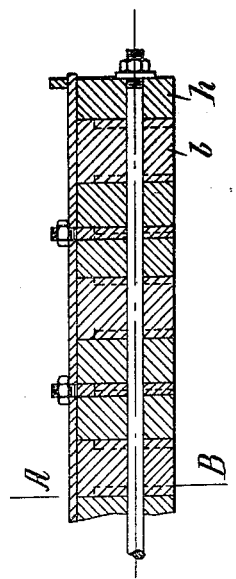
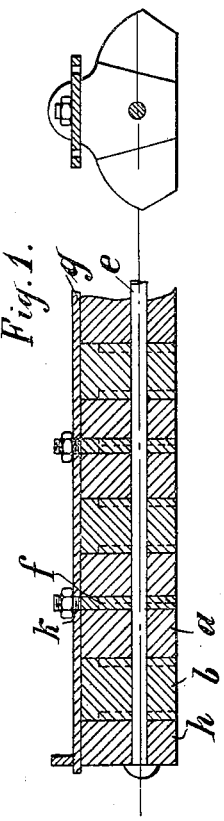
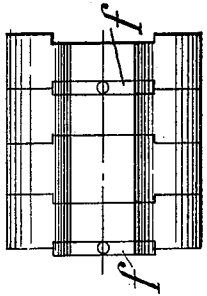
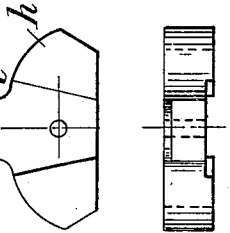
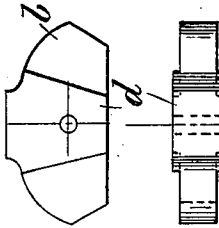

UNITED STATES PATENT OFFICE.

HEINRICH JASSOY, OF STUTTGART, GERMANY.

RAILROAD-SLEEPER.

SPECIFICATION forming part of Letters Patent No. 659,749, dated October 16, 1900.

Application filed July 28, 1900. Serial No. 25,209. (No model.)

*To all whom it may concern:*

Be it known that I, HEINRICH JASSOY, professor in the Royal Technical Institute of Stuttgart, a subject of the King of Prussia, Emperor of Germany, residing at 51 Kronenstrasse, in the city of Stuttgart, in the Kingdom of Würtemberg, in the German Empire, have invented certain new and useful Improvements in Railroad-Sleepers, of which the following is a specification.

This invention comprises sleepers adapted for use with any kind of railroads, electric roads, tram-car roads, and the like; and it is especially distinguished by being composed of several sections bolted together in any suitable manner. Each of these several sections is provided with projections and grooves fitting into corresponding grooves and projections of the next succeeding section and is further securely connected by a transverse rail or bar extending over the whole length of the sleeper and serving for the attachment of the rails unto the same. The sectional sleepers as employed heretofore are objectionable by their allowing of a lateral displacement of the several sections, the meeting surfaces of which were smooth, so that the weight was not evenly distributed upon the road-bed, and the distance of the rails was changed if part of the sectional sleeper was destroyed or injured. All these inconveniences are avoided in my invention, as pointed out in the claim.

The accompanying drawings show by way of example a preferred form of sleeper embodying my invention.

Figure 1 is a longitudinal section, and Fig. 1$^a$ a vertical section on the line A B of Fig. 1. Fig. 2 is a top view of the sectional sleeper. Figs. 3, 4, and 5 are side and plan views of the sectional pieces and of the end piece. Fig. 6 illustrates the manner of bolting together the several sections.

The sleeper is made up of the sections $a$ and $b$, made from any natural or artificial material or composition. $c$ represents grooves on the sections preferably dovetailed and registering with corresponding projections $d$ of the next section. A bolt $e$ serves to secure the several sections together. Some of the sections (four are shown in the drawings) are placed together with their grooved sides, so as to form holes for the reception of flat locking-plates $f$ of wedge-shaped iron section, and to whose upper extremities is secured the plate or rail $g$ on top of the sleeper and serving for the attachment of the rails. $h$ represents the sectional pieces at the extremities of the sleeper, to which are secured the fish-plates $i$, having openings $l$ for the reception of the ends of the plate or rail $g$. The several sections of the sleeper are secured together by the bolt $e$. Openings are provided in the top plate or rail $g$ for the entrance of the locking plate or bolt $f$. The bolts for attaching the rails are passed through other openings $k$ of the top plate. Before uniting them together the contacting surfaces of the several sections are preferably coated with tar, bitumen, or the like and may be so arranged as to prevent longitudinal displacement and at the same time to allow access to the bottom of the sleeper.

By the attachment of a top plate or rail extending over the whole length of the sleeper it is possible to keep the rails at exactly the same distance independent of injuries to any of the sections. By the engagement of the lateral recesses and projections or tongues the several sections are securely united with each other, and the weight is evenly distributed throughout and upon the road-bed.

Sleepers as constructed according to my invention are especially of advantage for switches where the distance of the rails and their attachments to the sleepers under both tracks are varying. The rail distance and the attachment may be adjusted with accuracy independent upon the configuration and arrangement of the sections of the sleeper by changing the position of the openings of the top plate or rail $g$. In the construction of sleepers as heretofore practiced switching could never be effected with absolute security in view of the distance of the rails being dependent on the sections and joints of the sleepers and rails. Destruction or injury of one of the sections will not interfere with the true distance of the rails, which will still be maintained by the top plate or rail, while in the sectional sleepers as used heretofore injury to one of the sections resulted in a change of distance and very often was the cause of a derailment.

What I claim, and desire to secure by Letters Patent of the United States, is—

In a sectional sleeper for railroads of any kind sectional pieces, $a$, $b$, having tongues or projections $d$, and corresponding recesses $c$, and a bolt $e$, for effecting their union in combination with a top plate or rail $g$, secured to the top of the sectional sleeper by locking plates or bolts $f$, thereby preventing change of rail distance and causing an even distribution of weight upon the road-bed, substantially as described.

In witness whereof I have hereunto signed my name in the presence of two subscribing witnesses.

HEINRICH JASSOY.

Witnesses:
CH. WISSHAK,
WM. HAHN.